Jan. 3, 1933.    J. SCHMIDT    1,893,448
WADDING
Filed July 24, 1926

Inventor:
Jean Schmidt,
by
Attys.

Patented Jan. 3, 1933

1,893,448

UNITED STATES PATENT OFFICE.

JEAN SCHMIDT, OF STRASBOURG, FRANCE

WADDING

Application filed July 24, 1926, Serial No. 124,778, and in France January 29, 1926.

The ordinary wadding (i. e. cotton wool) and the cellulose wadding hitherto made are essentially hydrophile products.

The present invention has for its object:
1. A new process of manufacture of a cellulose wadding having the property of being non-hydrophile.
2. The new non-hydrophile cellulose wadding obtained by this new process, the properties of this product being different from the properties of the non-hydrophile cellulose wadding hitherto known.
3. The products formed by the said non-hydrophile wadding combined with other known wadding.
4. The various applications of these products.
5. Products resulting from these various applications.

According to the present invention a new non-hydrophile cellulose wadding is obtained by making hydrofuge a cellulose material at a stage prior to its conversion into wadding. Preferably a cellulose paste is made hydrofuge, e. g. by sizing and then converted into wadding.

As an example of the process of this type may be cited that process according to which the paste of cellulose is prepared according to the methods used for the preparation of ordinary hydrophile cellulose wadding and this paste is mixed during this preparation in a manner similar to that used in the preparation of the paste for making ordinary sized writing paper. Thus for example when the paste of cellulose prepared according to the known methods has been charged into the hollanders, this paste is sized therein by, for example, milk of glue (resinate of soda emulsified or the sodium soap of resin in the proportion of three parts of soap per 100 parts of cellulose, this proportion being, however, variable according to the nature of the cellulose). Before passing the refined paste of the hollanders into the feed wash tub of the wadding machine, aluminium sulphate may be added thereto in proportion of 3%; this proportion however varies with that of the soap and the amount of calcareous salts contained in the water used for the manufacture. In certain cases dextrin (British gum) or starch solubilized by alkali or otherwise may be added in the hollanders. Finally the resin soap or the starch may be replaced by gelatine which may be precipitated by a known reagent e. g. formaldehyde, formol or the like.

The paste thus obtained is then treated in machines similar to those used in the manufacture of hydrophile cellulose wadding; as a result non-hydrophile cellulose wadding is obtained. It is to be pointed out that this result is obtained without soiling the felts or the cylinders of these machines.

The wadding of non-hydrophile cellulose which is so obtained made from the waterproofed paste, differs from wadding which is made waterproof by subsequent impregnation, for in fact the fibre itself is sized much more uniformly and thoroughly when it is sized in the paste, and the sizing substances thus enter the interior of the duct of each fibre and becomes fixed upon the latter. The resinous sizing will penetrate into the fibre with a still greater effectiveness since the fibre when in the moist state shows a marked affinity for the milky resinous substance.

The special qualities further result from the fact that by reason of the sudden and violent heating of the fibre on the drying cylinder of the machine, the resinous substance melts and forms a very thin and uniform film of resin, since the very fine particles of resin become melted by the heat and thus adhere to one another.

It should be further observed that by this process the fibre is more flexible and can be much better felted than the fibre obtained by the known processes. I thus obtain thin waterproof layers which are much thinner than those resulting from the known methods.

Since each fibre is thoroughly sized, the layers of cellulose wadding may be opened, or separated, without altering the waterproof quality.

The above wadding of non-hydrophile cellulose may be used in any suitable manner in all cases where non-hydrophile wadding or a similar known hydrofuge products is required. Moreover it may also be used in the production of new products formed in part by layers of hydrophile wadding, wadding of hydrophile cellulose or any other hydrophile wadding and partly by layers of wadding of non-hydrophile cellulose, and, in all these applications, by reason of its particular properties, the said wadding of non-hydrophile cellulose gives products having also particular properties and which are in the scope of the present invention.

Thus, by superimposing on one another a certain thickness of hydophile wadding and a certain thickness of wadding of non-hydrophile cellulose and fixing if necessary, these two separate waddings with respect to one another, another new product is obtained which is hydrophile on one face and hydrofuge on the opposite face and which has particular properties for the reasons hereinabove explained. This product has numerous applications, thus simply by way of example and without its being in any way limiting, this product may be used in the manufacture of cloths, napkins, hygienic or sanitary towels for surgical use or ladies', or children's use or for other purposes.

This non-hydrophile wadding may also be used in the manufacture of products which are hydrophile on both faces, that is to say products comprising two thicknesses of hydrophile wadding forming the faces of the outer surfaces of the product, these two layers being separated by a layer of wadding of non-hydrophile cellulose and these products may thus be used either simultaneously with both hydrophile faces or by each of these faces successively after turning.

It is obvious that the present invention comprises all the applications which may be effected of the products mentioned above, that is to say on the one hand all the applications of the wadding of non-hydrophile cellulose and on the other hand all applications of the products formed of wadding of non-hydrophile cellulose and hydrophile wadding as well as the products of all kinds resulting from these applications.

Figures 1-3 of the accompanying drawing show three forms of the invention.

Figure 1:
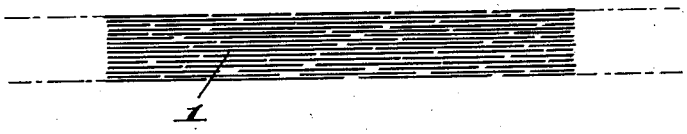
Figure 1 shows diagrammatically a cross section of a product made of sheet of hydrofuge cellulose wadding 1.
Figure 2:
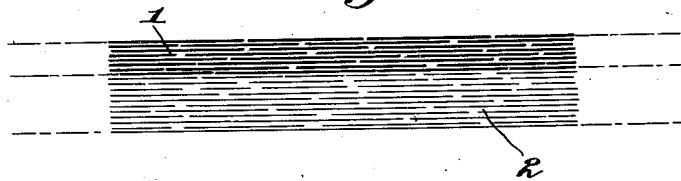
Figure 2 shows likewise a cross section of a product which is both hydrofuge and hydrophile and in which one of the faces is formed by sheets of hydrofuge cellulose wadding 1 and the other face is formed by sheets of hydrophile cellulose wadding 2.
Figure 3:
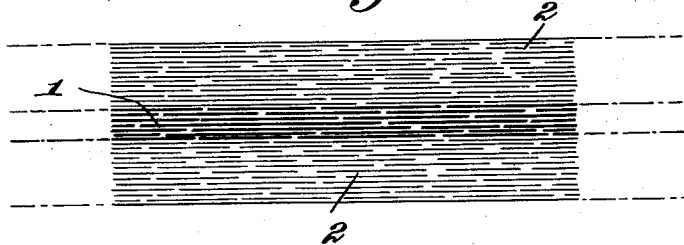
Figure 3 shows a cross section of a product which is also both hydrofuge and hydrophile and which is formed of two layers of hydrophile cellulose wadding 2 separated from one another by a layer of wadding of hydrofuge cellulose.

It will be understood also that the present invention covers the application to the manufacture of wadding of non-hydrophile cellulose of the plant, machinery and apparatus used in the manufacture of wadding of hydrophile cellulose or of products containing the hydrophile cellulose wadding. Similarly it covers the application to the manufacture of products formed of wadding of non-hydrophile cellulose and hydrophile wadding of the plant, machinery and apparatus for the manufacture of wadding of non-hydrophile cellulose or products containing this wadding and also the plant, machinery and apparatus for manufacturing hydrophile wadding or products containing hydrophile wadding.

I declare that what I claim is:—

The process of manufacturing hydrofuge cellulose wadding which consists in sizing cellulose paste and then converting the sized paste into wadding.

In witness whereof I have hereunto set my hand.

JEAN SCHMIDT.